E. A. VARY.
HAND FRUIT PITTER.
APPLICATION FILED MAR. 18, 1912.
1,038,993.
Patented Sept. 17, 1912.
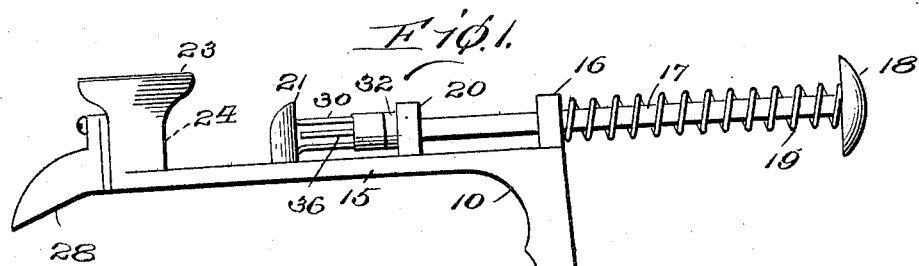
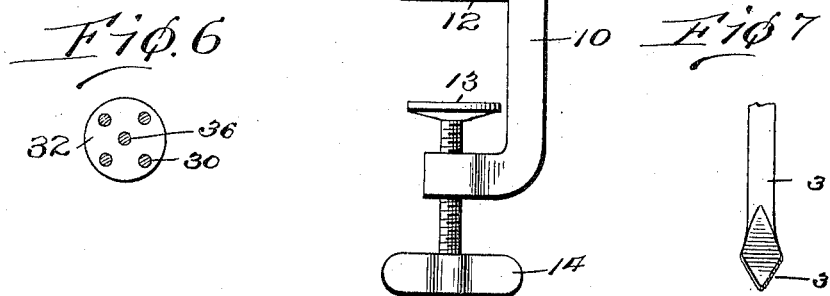
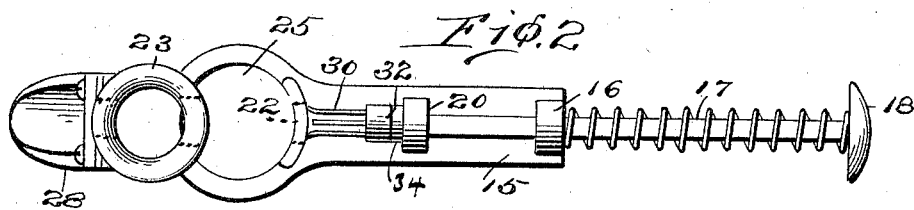
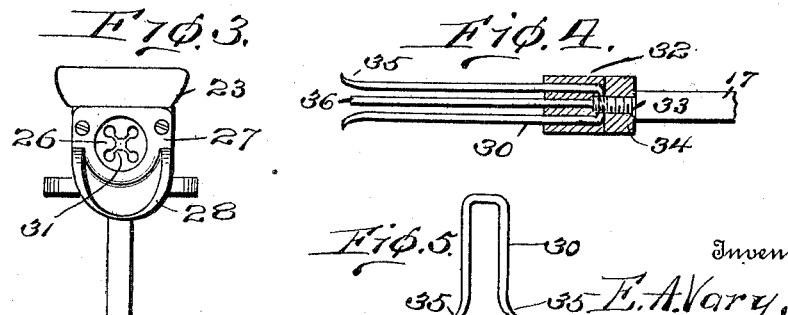
Inventor
E. A. Vary,

UNITED STATES PATENT OFFICE.

ELMER A. VARY, OF MIDDLEPORT, NEW YORK.

HAND FRUIT-PITTER.

1,038,993.  Specification of Letters Patent.  Patented Sept. 17, 1912.

Application filed March 18, 1912. Serial No. 684,611.

*To all whom it may concern:*

Be it known that I, ELMER A. VARY, a citizen of the United States, residing at Middleport, in the county of Niagara and State of New York, have invented certain new and useful Improvements in Hand Fruit-Pitters; and I do hereby declare the following to be a full, clear, and exact description of the invention, such as will enable others skilled in the art to which it appertains to make and use the same.

This invention relates to hand fruit pitters, and one of the chief objects is to provide an improved fork member for piercing and forcing the pit from the fruit without crushing or otherwise injuring the latter.

Briefly described, the invention comprises a bracket member including a clamp and means for supporting a hopper and plunger, the latter being designed to carry the fork. The fork includes a plurality of prongs, one of which is arranged centrally of the others, the outer prongs being specially constructed, as hereinafter described.

In the accompanying drawings forming part of this application, Figure 1 is a view of the device in side elevation; Fig. 2 is a top plan view; Fig. 3 is an end view; Fig. 4 shows the fork, the shank portion being in section; Fig. 5 is a detail of the prongs; Fig. 6 shows the spacing of the prongs; Fig. 7 is a view taken at right angles to the view presented in Fig. 5.

In carrying out my invention, I employ a frame 10, which may be substantially right angular in form, and the lower portion of which includes a clamp comprising the upper clamping member 12, and a movable clamping member 13 operated by means of an ordinary turn bolt or screw 14. The upper portion of bracket 10 comprises a bar 15 which may be deflected downwardly to a slight extent, and said bar 15 carries at one end a lug 16 having a bore for the accommodation of bar 17, constituting a plunger. The bar 17 carries on one end a hand member 18 and between the latter and lug 16 a coiled spring 19 is located to insure the return of the plunger after it has been pressed by the hand. Bar 15 also carries a lug 20 provided with a bore for the accommodation of plunger 17, and a shield member 21 is mounted on bar 15, to the left of lug 20 as shown in Fig. 1, and suitably spaced therefrom. This shield is provided with an aperture 22.

Hopper 23 is mounted on the end of bar 15, and is provided with an opening 24 in one wall thereof, to permit of the extraction of the fruit after the pit has been removed. An opening 25 formed in bar 15 permits the fruit after being pitted and withdrawn from the hopper to pass downwardly to a suitable receptacle, after being separated from the fork hereinafter described by means of the shield or fruit removing device 21. Hopper 23 is further provided with an opening on the side opposite opening 24, such opening being closed by means of a pit removing device 26, preferably formed of rubber and perforated to provide for the passage of the prongs of the fork. The said device 26 is held in position by means of a member 27 which may be formed integrally with trough 28, through which latter the pits are discharged after being removed from the fruit.

The fork constitutes an important feature of the invention and comprises a plurality of outer prongs 30, four of which may be employed, if desired, to correspond with the outer openings, shown in Fig. 3, in the pit removing device 26. It may here be noted that the several openings for the accommodation of the prongs are connected by means of slots 31, between the central opening and the several openings spaced therefrom. The outer prongs 30 are each formed of spring metal, and two adjoining prongs may be connected to form a staple-like member as shown in Fig. 5, the middle portion of the staple appearing at the top of shank portion 32, the prongs of each staple-like member passing through an aperture formed longitudinally in shank portion 32. The said portion 32 is provided with a central threaded aperture for the accommodation of threaded portion 33 of the plunger proper. A collar 34 on the plunger serves to retain the staples in position.

The prongs 30, of spring metal, are outwardly turned at their free ends and are flattened at the portions 35, whereby the metal is spread slightly and made thinner, this form being found to be most suitable for operating upon the fruit. A central prong 36 is straight and is somewhat shorter than the outer prongs of the fork, the central prong engaging the pit directly, whereas the outer prongs engage the pit slightly on the sides thereof.

The outwardly turned and broadened ends of prongs 30 serve to retain the fruit until the latter is withdrawn from the hopper, and these prongs pierce but do not crush the fruit.

What I claim is:

1. In a fruit pitter, means for receiving the fruit, a plunger, a fork carried thereby, said fork comprising a plurality of fruit piercing prongs having their ends outwardly turned and flattened, and a prong for directly and positively engaging a pit. said flattened prongs being of staple-like form and having their sides substantially parallel, a shank portion provided with bores through which said flattened prongs extend, the prongs having portions disposed within said bores, and a collar carried by the plunger and provided with a central bore, said plunger having a reduced portion passing through the bore last mentioned and entering the shank portion at a point between the parallel members of the prongs.

2. In a fruit pitter, means for receiving the fruit, a plunger, a fork carried thereby and comprising a plurality of staple-like members having their ends outwardly turned, a shank portion for carrying said members, portions of said members extending through the shank, and a collar abutting the middle portion of each staple member, for retaining the same in position.

3. In a fruit pitter, means for receiving the fruit, a plunger, a fork carried thereby and comprising a plurality of staple-like members having their ends flattened, broadened, and outwardly turned, a shank portion provided with a plurality of bores for the prongs, portions of said members extending through the shank, a collar carried by the plunger and abutting the central portion of the staple members at one end of the shank, and a prong located between the prongs first mentioned and terminating at a slight distance from the ends thereof, said shorter prong engaging the pit directly when received between the ends of the other prongs.

In testimony whereof I affix my signature in presence of two witnesses.

ELMER A. VARY.

Witnesses:
  IRVING E. VAN NORTWICK,
  WALTER J. VARY.